US010748408B2

(12) United States Patent
Ramirez

(10) Patent No.: US 10,748,408 B2
(45) Date of Patent: Aug. 18, 2020

(54) LIGHT SWITCH APPARATUS, CONTROL SYSTEM, AND CONTROL METHOD THEREOF

(71) Applicant: Andre Ramirez, Fountain Valley, CA (US)

(72) Inventor: Andre Ramirez, Fountain Valley, CA (US)

(*) Notice: Subject to any disclaimer, the term of this patent is extended or adjusted under 35 U.S.C. 154(b) by 0 days.

(21) Appl. No.: 16/261,519

(22) Filed: Jan. 29, 2019

(65) Prior Publication Data

US 2019/0236929 A1    Aug. 1, 2019

Related U.S. Application Data

(60) Provisional application No. 62/623,154, filed on Jan. 29, 2018, provisional application No. 62/691,739, filed on Jun. 29, 2018.

(51) Int. Cl.
| | |
|---|---|
| *F24F 11/47* | (2018.01) |
| *G08B 21/24* | (2006.01) |
| *G06Q 50/06* | (2012.01) |
| *H04L 29/08* | (2006.01) |
| *G08B 5/36* | (2006.01) |

(52) U.S. Cl.
CPC .............. *G08B 21/24* (2013.01); *F24F 11/47* (2018.01); *G06Q 50/06* (2013.01); *G08B 5/36* (2013.01); *H04L 67/10* (2013.01); *H04L 67/125* (2013.01); *H04L 67/325* (2013.01)

(58) Field of Classification Search
CPC ..... F24F 2140/60; F24F 11/47; Y02P 80/114; Y02B 70/3216; Y02B 90/245; Y04S 10/40
See application file for complete search history.

(56) References Cited

U.S. PATENT DOCUMENTS

| | | | | |
|---|---|---|---|---|
| 2005/0184867 A1* | 8/2005 | Osann, Jr. | ............. | H04L 67/125 340/539.25 |
| 2017/0122774 A1* | 5/2017 | Quady | ................... | G01D 4/002 |

* cited by examiner

*Primary Examiner* — Benyam Haile
(74) *Attorney, Agent, or Firm* — Knobbe, Martens, Olson & Bear, LLP

(57) ABSTRACT

A light switch apparatus includes a network communication unit and an output unit. The network communication unit is configured to receive electricity price rate server information from a server, and generate a first high range electricity price output data and a second low range electricity price rate data according to the electricity price rate server information. The output unit is configured to display at least a first output color in response to receiving the first high range electricity price output data from the network communication unit, and a second output color in response to receiving the second low range electricity price rate data from the network communication unit.

20 Claims, 13 Drawing Sheets

LIGHT SWITCH APPARATUS, CONTROL SYSTEM, AND CONTROL METHOD THEREOF

REFERENCE TO RELATED APPLICATIONS

This application claims the priority to U.S. Provisional Patent Application No. 62/623,154, entitled "LIGHT SWITCH APPARATUS," filed on Jan. 29, 2018, and U.S. Provisional Patent Application No. 62/691,739, entitled "DATA EXCHANGE SYSTEM FOR LIGHT SWITCH APPARATUS OR WALL PLATE APPRARATUS", filed on Jun. 29, 2018, the entire contents of which are incorporated herein by reference.

FIELD OF THE INVENTION

The present invention relates to the field of light switch apparatuses. More particularly, the present invention relates to light switch apparatuses capable of communicating status information to users and dimming connected lighting systems upon programmed or ad hoc price signal events as well as a control system and a control method thereof.

BACKGROUND

Following the introduction of electronic metering, utility providers now have the capability of varying prices between times of low and high electricity demand. As a result, electricity rates for residential, commercial and industrial customers can vary by time-of-day. For example, Time of Day metering (TOD) involves dividing the day, month and year into tariff slots and with higher rates at peak load periods and low tariff rates at off-peak load periods. TOD metering normally splits rates into an arrangement of multiple segments including on-peak, off-peak, mid-peak or shoulder, and critical peak, but this metering also enables more dynamic pricing such as real time prices reflective of actual fluctuations in market supply and demand. The times of high and low demand/cost will vary in different markets around the world. While the electricity rate schedule can be used to automatically control usage on the part of the customer, it is often simply the customer's responsibility to control their own usage, or pay accordingly. One approach for a customer to save on the electrical bills is to reduce lighting intensity or shift appliance usage away from time slots with high electricity rates, especially when higher intensity of usage is not needed and increase usage during the periods of lowest prices, There are light switches with dimmer functionality to meet energy efficiency requirements and customer lighting preferences. A variety of means are available to control the diming of lights, including rotational knobs, mechanical sliders, buttons, and more recently, solid state touch-sensitive electrical switches which can be manually operated by a user to increase and decrease the light intensity. There are also light switch apparatuses available to turn on or off the lights according to a preprogramed schedule or triggered by a sensed event, such as detected motion or sound. However, there are no convenient approaches for automating the adjustment of lighting intensity according to highest and lowest electricity rate schedules while informing a user of the electricity rate change in a straightforward and intuitive manner. The currently available light switch apparatuses also do not provide highest and lowest electricity-price related information using visual or audible signals to assist users to optimize cost saving by using the time-dependent electricity price information to make better usage decisions.

Standalone devices to provide price information or other events have been demonstrated to significantly decrease energy usage from less advantageous price periods to more advantageous price periods, which may be scheduled or ad hoc.

Therefore, there is continued need for systems that provide users automated and convenient means to save cost according to the highest and lowest electricity rates or other information and/or provide straightforward means to inform the end users of the time-dependent electricity prices.

SUMMARY OF THE INVENTION

One objective of the present invention to provide a light switch apparatus that offers automated and convenient means to save electricity cost according to electricity rate schedule and to inform a user of the electricity rate changes or other relevant information.

In one aspect of the present disclosure, a light switch apparatus is provided. The light switch apparatus includes: a network communication unit configured to receive electricity price rate server information from a server, the electricity price rate server information comprising at least a first server data indicative of a high range of a current electricity price rate and a second server data indicative of a low range of the current electricity price rate that is lower than the high range of the current electricity price rate, the network communication unit further configured to output a first high range electricity price output data when the current electricity price rate is in the high range and to output a second low range electricity price rate data when the current electricity price rate is in the low range; and an output unit configured to display at least a first output color and a second output color that is different from the first output color, the output unit further configured to receive first high range electricity price output data and the second low range electricity price rate data from the network communication unit, the output unit being configured to display the first color in response to receiving the first high range electricity price output data from the network communication unit and to display the second color in response to receiving the second low range electricity price rate data from the network communication unit.

In certain embodiments, the network communication unit of the light switch apparatus is configured to compare the first server data indicative of the high range and the second server data indicative of the low range to a predetermined electricity rate price and to determine that the first server data corresponds to a higher range electricity price rate when the first server data is indicative of an electricity rate price that is higher than the predetermined electricity rate price and to determine that second server data corresponds to a lower range electricity price rate when the second server data is indicative of an electricity rate price that is lower than the predetermined electricity rate price.

In certain embodiments, the output unit of the light switch apparatus is further configured to determine a highest electricity price range and a lowest electricity price range and corresponding output colors based upon electricity price information received from the server.

In certain embodiments, the output unit of the light switch apparatus is further configured to receive output information from the server based on a determination of highest and lowest electricity price information as determined by the server.

In certain embodiments, the output unit of the light switch apparatus is further configured to display at least one of a text or an icon according to the electricity price rate server information.

In certain embodiments, the output unit of the light switch apparatus is further configured to sound an alarm in response to the current electricity price rate being within the highest electricity price range or the lowest electricity price range.

In certain embodiments, the output unit of the light switch apparatus is further configured to detect a change in the current electricity price rate from being in the highest electricity price range to being in the lowest electricity price range, and sound an alarm in response to the current electricity price rate changing from the highest electricity price range to the lowest electricity price range.

In certain embodiments, the light switch apparatus further includes a wall plate; and the output unit is located on the wall plate to output information according to the current electricity price rate.

In certain embodiments, the light switch apparatus further includes a power control circuit, wherein the power control circuit is configured to turn on, turn off, maintain, increase, and decrease the luminous intensity of the external lighting apparatus according to the current electricity price rate.

In another aspect of the present disclosure, a light switch apparatus is provided. The light switch apparatus includes: a network communication unit configured to receive server information from a server, the server information comprising at least a first server data indicative of an event determined by the server, the network communication unit further configured to output information according to the server information; and an output unit configured to display a first output color in response to receiving a first set of data from the network communication unit and to display a second output color in response to receiving a second set of data from the network communication unit.

In certain embodiments, the server information includes a high value corresponding to the first output color and a low value corresponding to the second output color.

In certain embodiments, the server information includes a preset value corresponding to an output sound.

In certain embodiments, the server information includes data indicative of specific events; the network communication unit is configured to generate output color data according to the data indicative of the specific events; and the output unit is configured to display colors according to the output color data.

In certain embodiments, the server information includes data indicative of specific events; the network communication unit is configured to generate output audio data according to the data indicative of the specific events; and the output unit is configured to output sounds according to the output audio data.

In certain embodiments, the light switch apparatus further includes a power control circuit, wherein the power control circuit is configured to turn on, turn off, maintain, increase, and decrease the luminous intensity of the external lighting apparatus according to the server information.

In another aspect of the present disclosure, a light switch control system is provided. The system includes: a server having a processor, a memory, and a server interface; and a plurality of light switch apparatuses, each light switch apparatus comprising: a network communication unit configured to receive server information from the server, the server information including a current electricity price rate; a user input unit for a user to turn on, turn off, increase, and decrease a luminous intensity of an external lighting apparatus; and an output unit configured to display an output color selected from a color set, wherein: the color set includes a plurality of colors, each color corresponding to an electricity price range; the plurality of colors include at least a first color corresponding to a highest price range and a second color corresponding to a lowest price range; and the output color is selected from the color set according to the current electricity price rate.

In certain embodiments, for each light switch apparatus of the light switch control system: the configuration information corresponding to the light switch apparatus includes a preconfigured rule corresponding to the light switch apparatus, the preconfigured rule including a corresponding relationship between electricity price rate ranges and an output color; the server interface is further configured to receive a selection of the preconfigured rule corresponding to the light switch apparatus; and the power control circuit of the light switch apparatus is further configured to turn on, turn off, maintain, increase, and decrease the luminous intensity of the external lighting apparatus according to both the current electricity price rage and the preconfigured rule.

In certain embodiments, the server interface is further configured to receive an input of alarm information; the server information further includes an alarm notification according to the alarm information; and the output unit of each light switch apparatus is configured to display the alarm notification.

In certain embodiments, the server is further configured to group the plurality of light switch apparatus into one or more light switch apparatus groups; and the server interface is configured to assign configuration information corresponding to each light switch apparatus group.

In certain embodiments, the server interface comprises one of: a web interface, a mobile device interface, and a smart device interface.

The above invention aspects will be made clear in the drawings and detailed description of the invention.

DETAILED DESCRIPTION OF THE INVENTION

In the detailed description, numerous specific details are set forth in order to provide a thorough understanding of the invention. However, it will be understood by those skilled in the art that these are specific embodiments, and that the present invention may be practiced also in different ways that embody the characterizing features of the invention as described herein.

Figure 1:
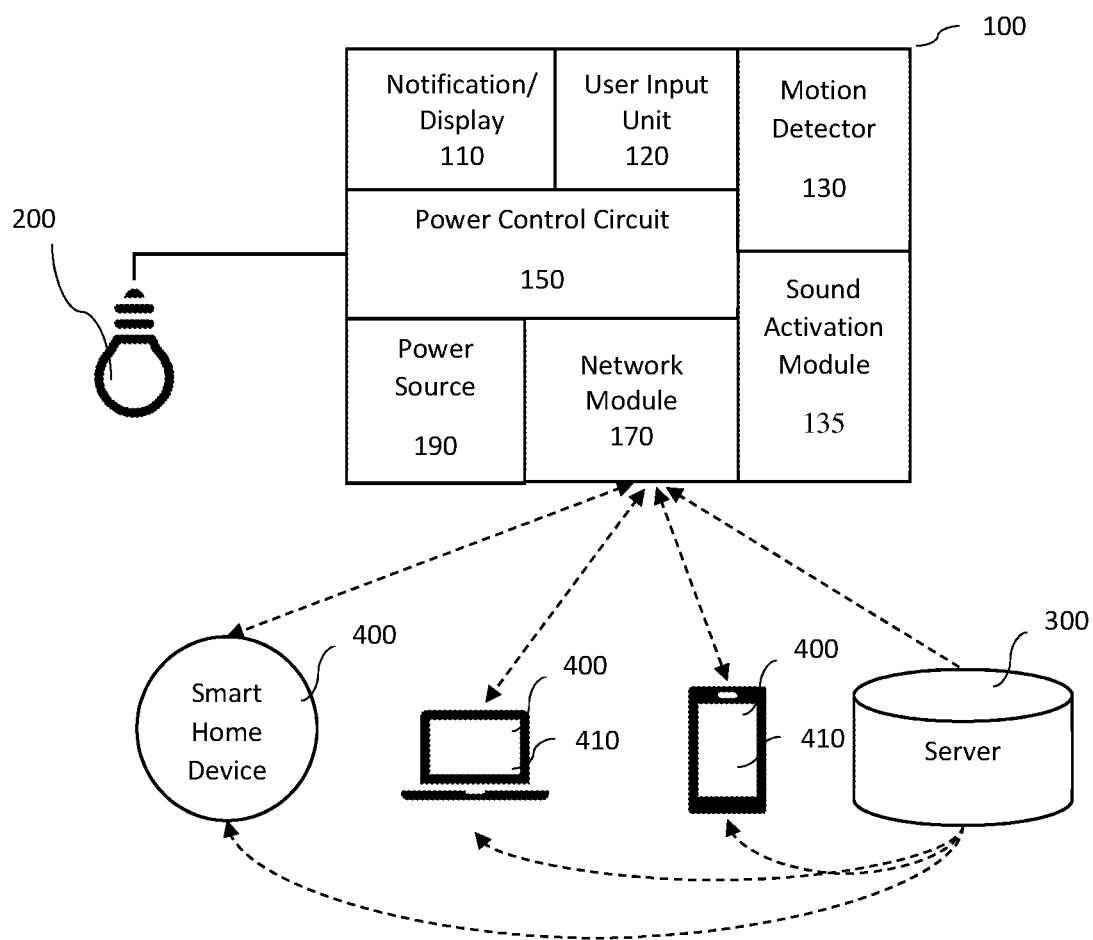
FIG. 1 is a diagram illustrating the functions, main components, and application environment of a light switch apparatus according to certain embodiment of the present disclosure.

In one aspect, the present disclosure provides a light switch apparatus. FIG. 1 is a diagram illustrating the functions, main components, and application environment of a light switch apparatus according to certain embodiments of the present invention. As shown in FIG. 1, a light switch apparatus 100 may include a power control circuit 150 that controls and adjusts the input power to an external lighting apparatus 200. The power control circuit 150 may be operated to turn on, turn off, keep, increase, or decrease the lighting intensity of the lighting apparatus (such as a light bulb) 200 based on certain information or conditions, such as a pre-programed schedule, a user input, a received message, an event trigger. In certain embodiments, the event trigger may be generated by a motion detector 130 or a sound activation module 135 to detect the presence of people in the vicinity. The light switch apparatus 100 may also include a user input unit 120 that offers a user a means to reset the lighting intensity or resent notifications, for example, to increase the lighting intensity that has been dimmed according to a pre-programed or preconfigured rule or schedule. The user input unit 120 may be embodied as switches, buttons, dial nobs, sliders, a touch screen, and so on. It may be configured to allow the user to manually turn on, turn off, or adjust the light intensity of the external lighting apparatus 200.

The light switch apparatus 100 may further include a notification/display component 110 to notify the user of the highest or lowest electricity rate information or a rate change of electricity or other information. The notification may be embodied as visual display with colored LED light indicators, LCD screens, or OLED displays. It also can be embodied as audio signals such as alarm, a buzzer, bells and chimes, or other sounds from a speaker.

The light switch apparatus 100 may further include a power source 190, such as one or more chargeable, non-chargeable, or solar cell batteries, to maintain operation during a power outage event. The light switch apparatus 100 may further include a network module 170 to obtain external data from a server 300 or to connect with additional user devices 400.

The network module 170 provides network connections such as through WIFI, Bluetooth, ZigBee or other standardized communication protocols. Using the provided network connection, the light switch apparatus 100 may communicate with the server to import electricity pricing data or other relevant information.

The light switch apparatus 100 may also connect to additional user devices 400 such as smartphones, computers, and smart home devices which may comprises customized software interfaces 410 to communicate with the light switch apparatus 100 and the server 300. The external user devices 400 and software interfaces 410 may be used to set lighting schedule, accepts user input (such as a reset command), and provide additional relevant information such as highest or lowest electricity price information, associated signals or other information to the light switch apparatus 100.

Figure 2:
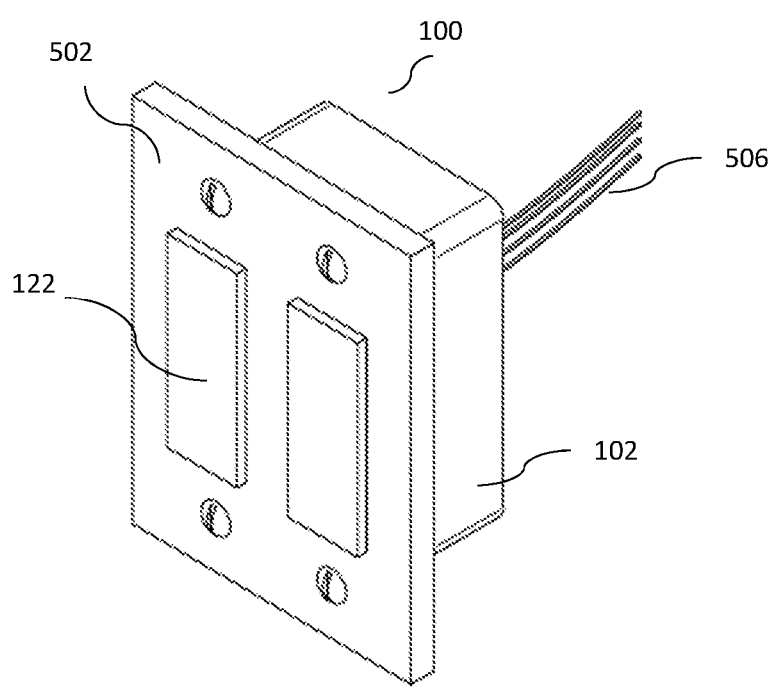
FIG. 2 is perspective view of a light switch apparatus according to an embodiment of the present disclosure.

FIG. 2 is perspective view of a light switch apparatus 100 according to certain embodiments. As shown in FIG. 2, the light switch apparatus 100 may be a retrofit device that can be fit into a wall-mounted switchbox by a wall plate 502. The switch buttons 122 are used as user input unit and can be further used as display components as will be described in FIGS. 3A-4C. Additional electrical and electronic components, such as the power control unit and the network module may be contained in a compact housing 102, which can fit into existing light switch apparatus box and connect to electrical appliances with connection wires 506.

Figure 3A:
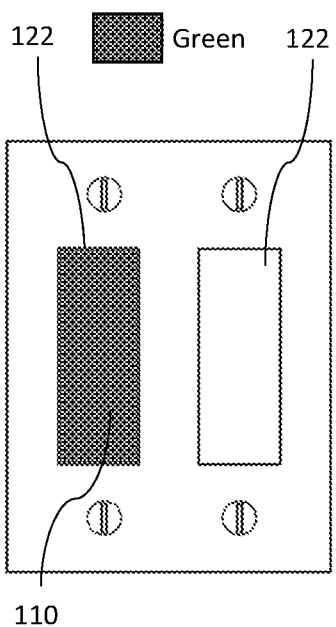
FIG. 3A is a front view of a light switch apparatus according to an embodiment of the present disclosure.
Figure 3B:
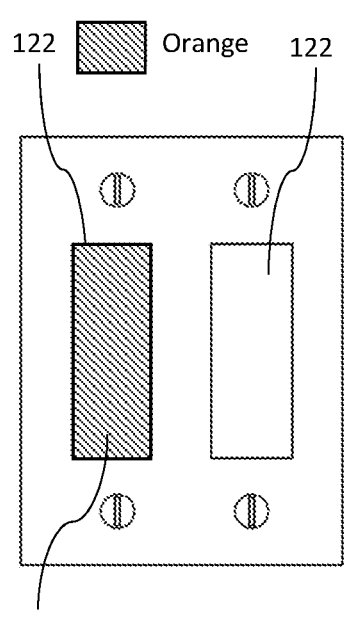
FIG. 3B is a front view of a light switch apparatus according to an embodiment of the present disclosure.
Figure 3C:
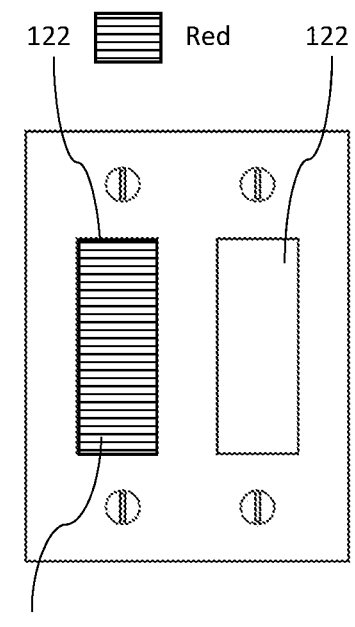
FIG. 3C is a front view of a light switch apparatus according to an embodiment of the present disclosure.

FIGS. 3A-3C are front views of a light switch apparatus according to certain embodiments. As shown in FIGS. 3A-3C, color displays may be incorporated to the switch buttons 122 to inform the users of different information, including the highest and lowest, levels of energy prices depending on times of day during a year or dynamic prices from external sources such as an energy or other company seeking to notify users. The switch buttons 122 change color depending on the level of the price, price period, or detected changes in energy price rate based on higher and lower price levels. For example, highest, lowest and non-highest or lowest, considered the medium price periods may be displayed as red (FIG. 3C), green (FIG. 3A), and orange (FIG. 3B) on the switch buttons 122, respectively. These display colors may prompt users to take certain actions such as increase or reduce energy use, based on low or high price levels, or take notice of some other information alert represented by a color. In certain embodiments, the color displays 110 may be implemented as backlit colored light generated by LED indicators incorporated behind the faces of the switch buttons 122. They may also be implemented by, for example, incorporating LCD or OLED screens to the switch buttons 122.

Figure 4A:
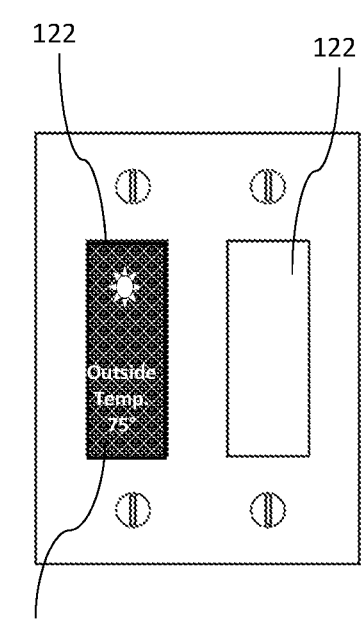
FIG. 4A is a front view of a light switch apparatus according to another embodiment of the present disclosure.
Figure 4B:
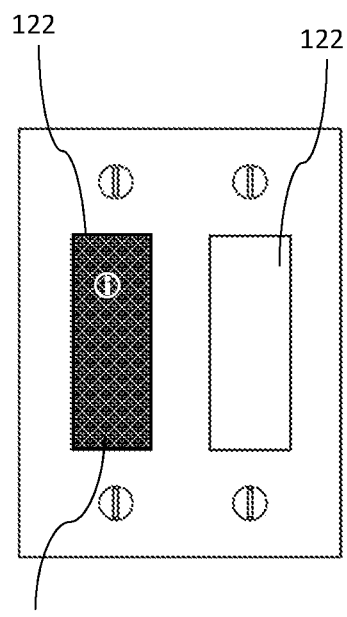
FIG. 4B is a front view of a light switch apparatus according to another embodiment of the present disclosure.
Figure 4C:
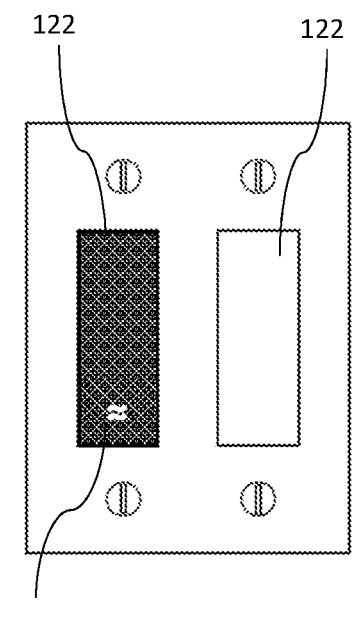
FIG. 4C is a front view of a light switch apparatus according to another embodiment of the present disclosure.

FIGS. 4A-4C show front views of a light switch apparatus according to certain other embodiments. As shown in FIGS. 4A-4C, in addition to color display 110, embedded display of images, icons and text may be available for the switch buttons 122 to convey additional information to the user, such as weather, temperature, status of energy bills, status of various connected appliances uses, highest or lowest electricity price rates or messages that call users to take certain actions. These displays may be implemented, for example, by incorporating LCD or OLED screens to the switch buttons 122.

Figure 5A:
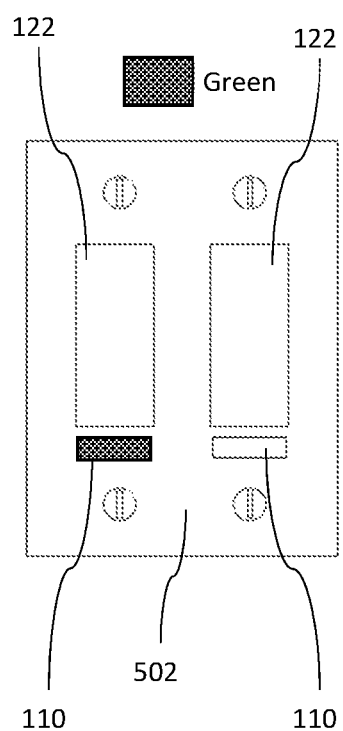
FIG. 5A is a front view of a light switch apparatus according to another embodiment of the present disclosure.
Figure 5B:
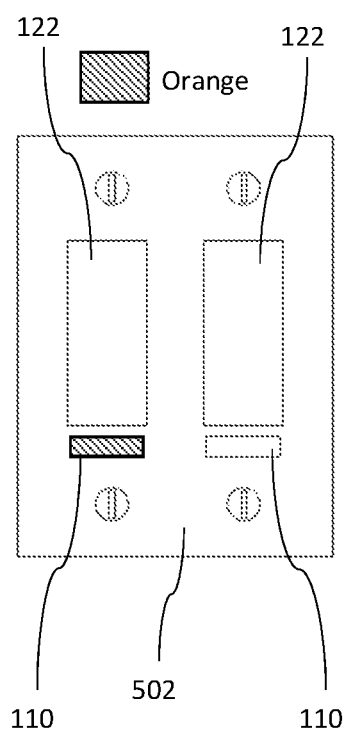
FIG. 5B is a front view of a light switch apparatus according to another embodiment of the present disclosure.
Figure 5C:
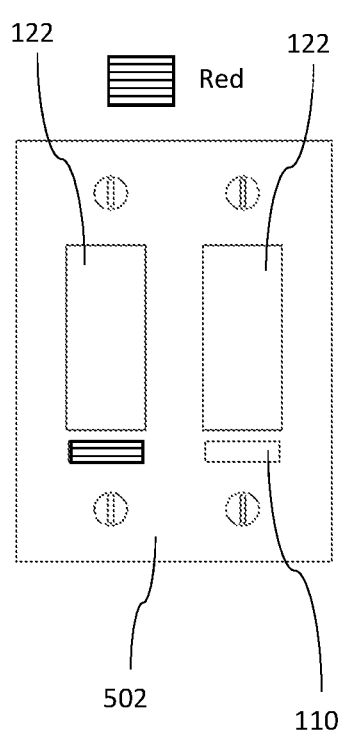
FIG. 5C is a front view of a light switch apparatus according to another embodiment of the present disclosure.

FIGS. 5A-5C show front views of a light switch apparatus according to certain other embodiments. As shown in FIGS. 5A-5C, the colored light indicators 110 may be placed outside of the switch buttons 122. LED lights may be used to signal highest or lowest electrical prices or other information.

Figure 6:
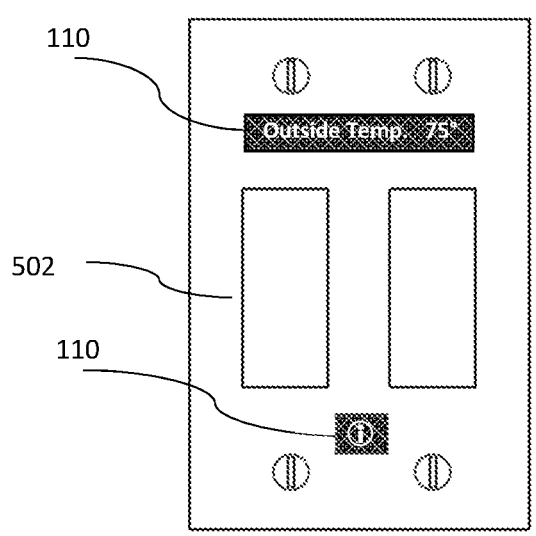
FIG. 6 is a front view of a light switch apparatus according to another embodiment of the present disclosure.

Alternatively, LCD or OLED screens and sound mechanisms may be incorporated in the wall plate surrounding a light switch 502 to convey information to the user including highest or lowest electricity price rate information. For example, FIG. 6 shows a front view of a light switch apparatus according to certain other embodiments. As shown in FIG. 6, one or more display/notification components 110 may be incorporated in the wall plate 502. These display/notification components 110 may be embodied LCD or OLED to display images, text, and symbols in addition to color display to convey additional information to the user, such as temperature, status of energy bills, status of various connected appliance uses or messages that call users to take certain actions.

Figure 7:
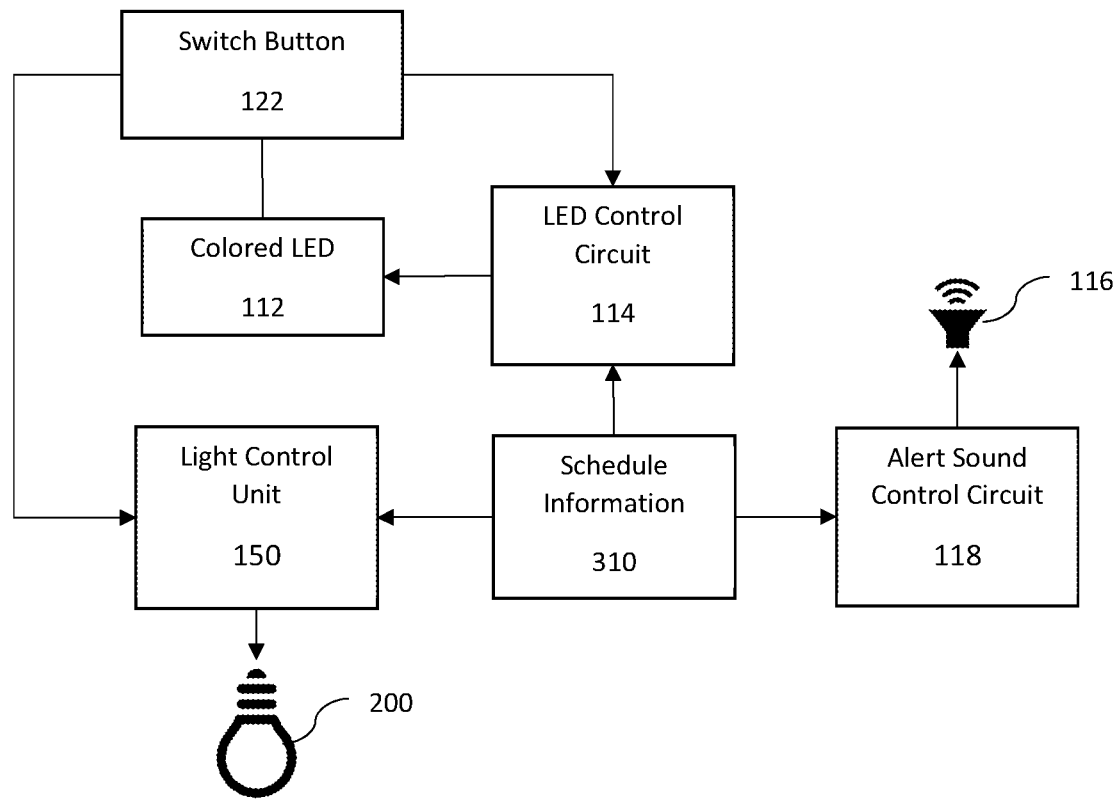
FIG. 7 is a diagram illustrating the components of a light switch apparatus of the present according to an embodiment of the present disclosure.

FIG. 7 is a diagram illustrating the components of an embodiment of the light switch apparatus 100 according to certain embodiments. As shown in FIG. 7, the power control circuit 150 may be pre-programed to adjust the output power to an external lighting apparatus 200 according to electricity pricing schedule information or a preconfigured rule 310. By pushing the switch button 122, a user may inform the power control circuit 150 to reset the lighting intensity, for example, to increase the lighting intensity that has been dimmed. Furthermore, an LED control circuit 114 may use the schedule information 310 to control the color display of one or more colored LED indicators 112. The light switch apparatus 100 may also comprise an alert sound control circuit 118 to generate an audio signal with a speaker 116 to alert a change of electricity price or other information.

Figure 8:
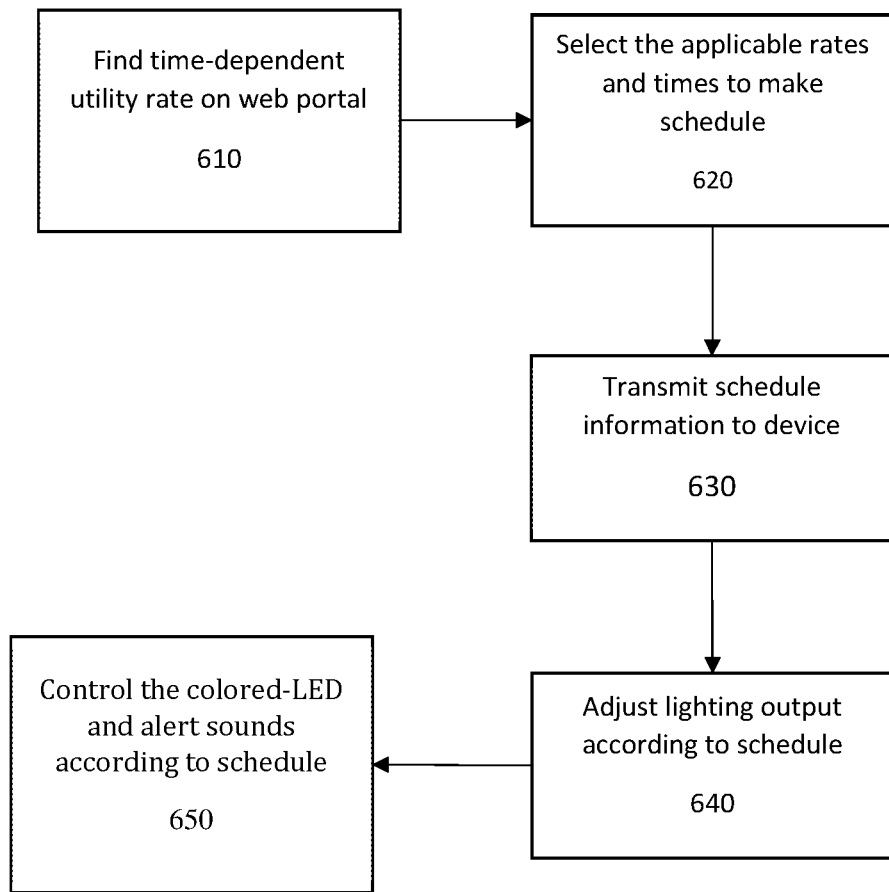
FIG. 8 is diagram describing the operation of a light switch apparatus according to an embodiment of the present disclosure.

FIG. 8 shows the operation of a light switch apparatus according to certain embodiments. First, in step 610, a user finds the time-dependent utility rate on a web portal, for example, from the utility provider's website or application associated with the light switch apparatus. Next, the user selects the applicable rates and times to make schedule (step 620) and transmit schedule or preconfigured notification information to the light switch apparatus 100 (step 630). The selection 620 and transmission 630 can be performed on an external user device 400 with a customized software interface 410. This way, the power control circuit 150 may be programed to adjust lighting output according to schedule (step 640). The electricity rate price information, preconfigured notification or schedule information 310 is also used to control the colored-LED and alert sounds (step 650).

Alternatively, in certain embodiments, the light switch apparatus 100 may receive real-time information including a current electricity prices, critical emergency type alerts or other related notifications from a server to inform users of ad hoc information. Colored-LED 112 and alert sounds 118 may be triggered by such events. And the power control circuit 150 may adjust the output power to an external lighting apparatus 200 according to the current information or alerts.

Figure 9:
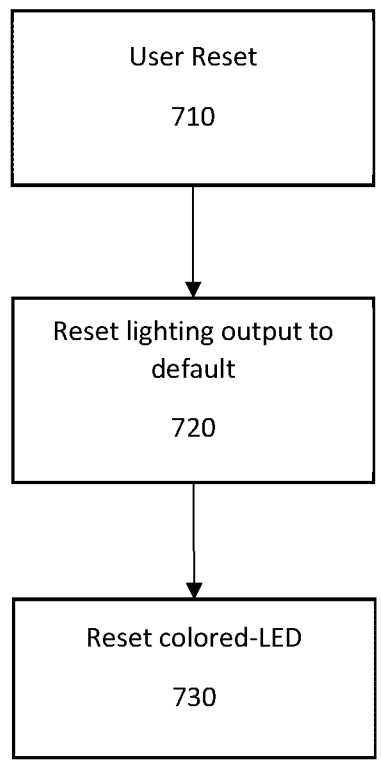
FIG. 9 is diagram describing the user reset operation of a light switch apparatus according to an embodiment of the present disclosure.

FIG. 9 shows the user reset operation of an embodiment of the light switch apparatus 100 according to certain embodiments. When the lighting apparatus is dimmed by the power control circuit 150 according to pre-programed schedule, a user has the option to reset the lighting intensity to full power by pushing the switch button 122 (step 710). The reset signal is sent to the power control circuit 150, which in turn resets the lighting output to full power (step 720). The colored LED display may also be adjusted accordingly (step 730) to reflect the status of the lighting.

In another aspect of the present disclosure, a light switch control system. In certain embodiments, the light switch control system comprises a server having a processor, a memory, and an interface. The server may be in communication with a plurality of light switch apparatuses to send them relevant information for controlling corresponding lighting apparatus such as light bulbs. Detailed description of the light switch apparatuses may be found in the forgoing embodiments and accompanying drawings, and will not be fully described again.

Figure 10:
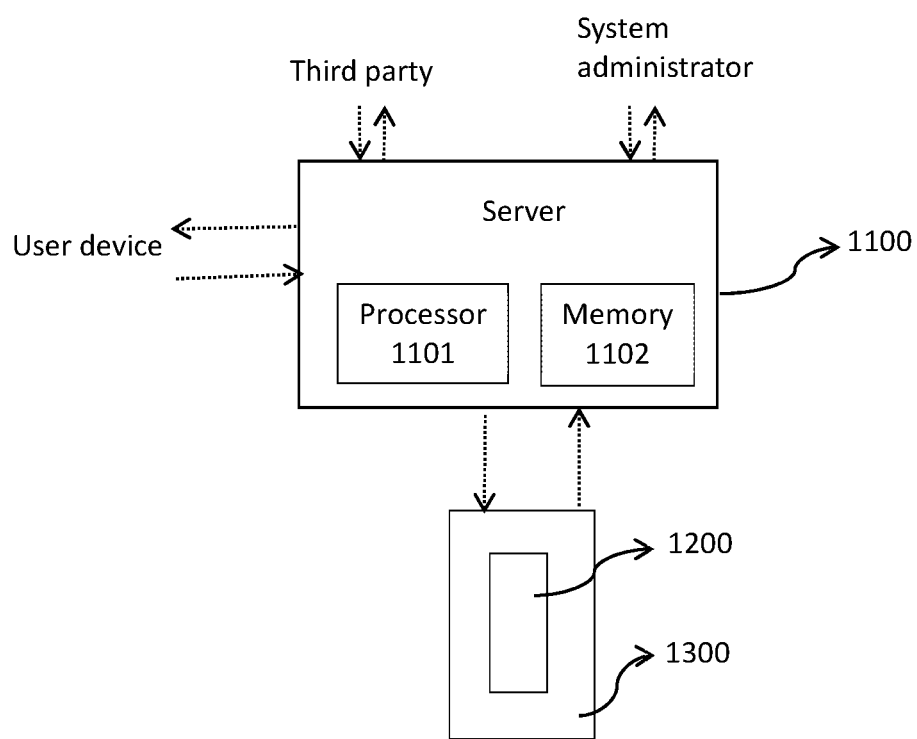
FIG. 10 is a diagram illustrating the functions and main components of the light switch control system according to an embodiment of the present disclosure.

FIG. 10 is a diagram illustrating the functions and main components of the light switch control system according to certain embodiments. As shown in FIG. 10, the system may include a server 1100 in communication with a plurality of a light switch apparatuses 1200 or a light switch wall plate 1300. The system 1100 may receive signals and inputs from a user device, a third party, and/or a system administrator. The system 1100 may send out data on the status of the light switches to the third party and/or the administrator.

For example, in certain embodiments, the server 1100 may download an electricity price rate schedule or other information from a third party for a geographical area where a particular light switch apparatus is located send the price rate schedule, preconfigured notification, or other information to the light switch apparatus. The system may generate a pre-programmed schedule according to highest, lowest and non-highest or lowest electricity prices, the electricity price rate schedule with preconfigured notification signals and send the information to the light switch apparatus. The signals or schedule may contain a time-dependent luminous intensity according to the electricity price rate schedule or user determined configuration. For example, a light source may be dimmed during a period of electricity price rate or price rate change according to the pre-programmed lighting schedule or user inputted configurations. Further, a user or a system administrator may access the server to customize the pre-programmed lighting schedule or make a selection from a list of pre-defined lighting schedules according to user preference or other factors. The light switch apparatus 1200 may adjust the output power of a light source according to the received electricity price rate schedule, detected changes in electricity price rates, and/or pre-programmed light schedule. The light switch apparatus 1200 may also inform a user the status or changes in electricity price rate via an output unit, such as a color display or an alarm bell.

Further, the system administrator or a third party may send an emergency alert, such as extreme weather alert, a flood warning, and so on, to the server 1100. The server may deliver the alert to a light switch apparatus located in a relevant geographical area, so that the light switch apparatus may display the alert information to the user. The system administrator or a third party may also send a non-emergency notice to the server 1100 associated with a particular light switch apparatus or a particular user, such as a package delivery notice, a utility bill overdue notice, and so on. The server may determine an appropriate means to inform the user of the notice.

Further, the server 1100 may collect the status data from the light switch apparatus 1200 on the status of the lighting intensity, or additional information from a user device.

Figure 11:
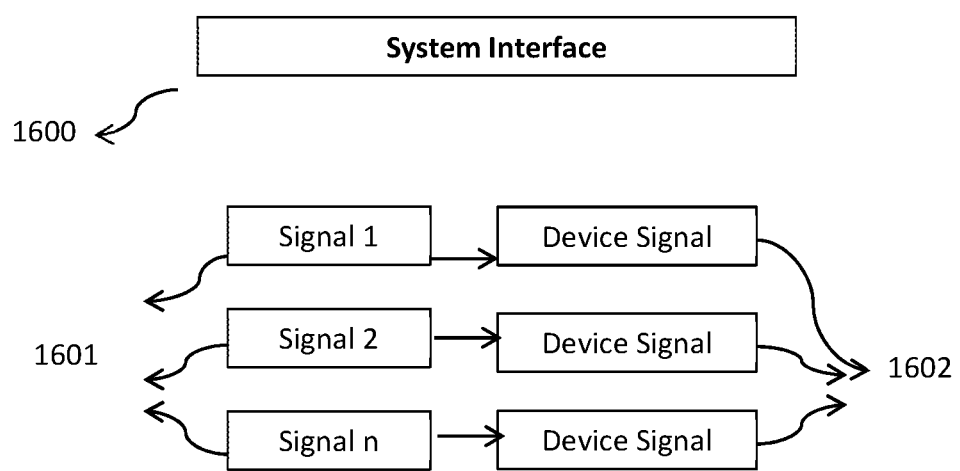
FIG. 11 is a diagram illustrating the functions and main components of the light switch control system according to an embodiment of the present disclosure.

In certain embodiments, the server may include an interface. As shown in FIG. 11, the system interface 1600 may receive one or more input signals 1601 and translates the input signals 1601 to the corresponding varying device signals 1602 such as different color displays or icons or alert sounds associated with high or low electricity prices. The device signals 1602 may be transmitted to corresponding devices, such as light switches 1200 and wall plates 1300 for control the operation of these devices. The user may use the system interface 1600 to program the behaviors and settings of their devices.

The interface 1600 may be configured to provide information from a third party using audio or visuals signals to light switches or light switch wall plates, and to inform a user of energy price changes or other relevant information. For example, the interface 1600 may be used for third parties to define messaging including energy price information that can be provided to users through a light switch or light switch wall plate display in the form of light signals, sounds, emoticons or other images, which have specific defined meanings to users such as the status of energy bills, rate levels, status of various connected appliance uses or messages that call users to take some action triggered by an external third party source. In certain embodiments, the interface 1600 may also comprise programming choices light switch or light switch wall plate users can select from to program the behavior, interfaces and settings of their devices. The interface 600 may also be used to convey data from the system back to third parties or a system administrator.

Figure 12:
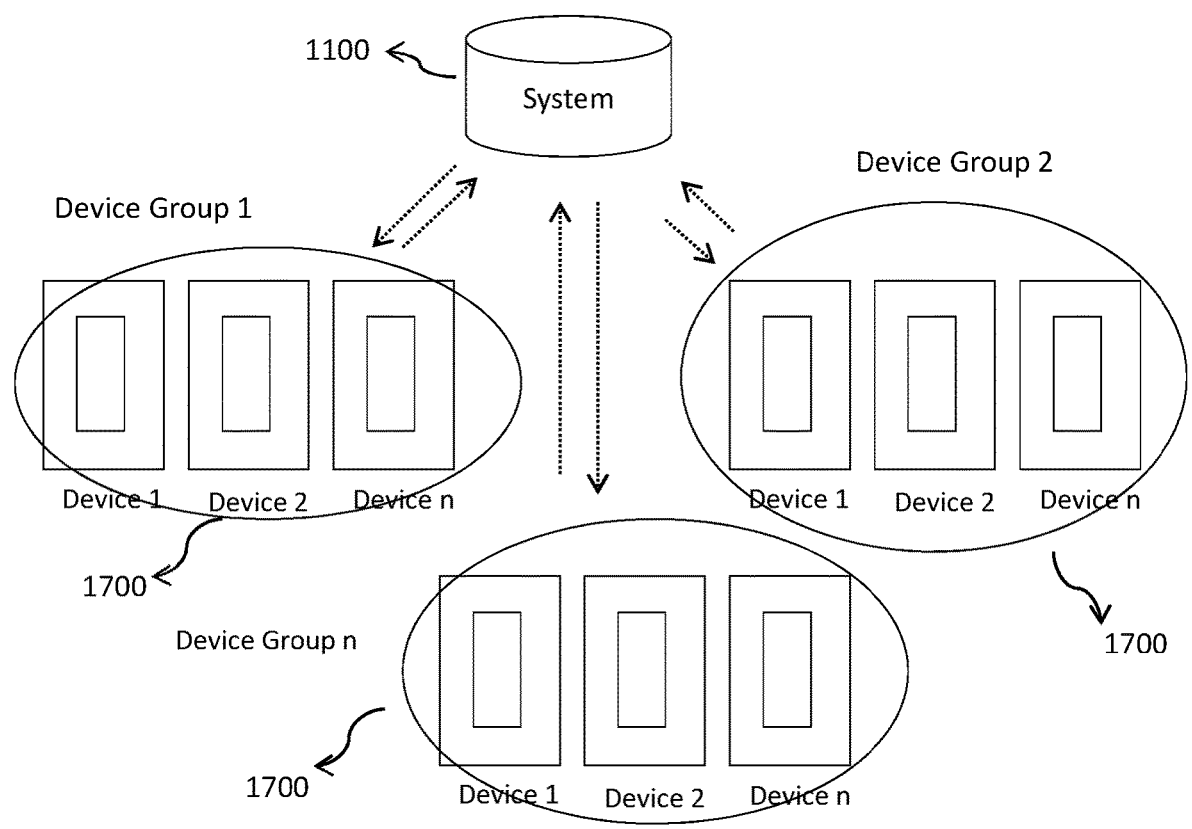
FIG. 12 is a schematic diagram of the server organizing and communicating with groups of devices according to an embodiment of the present disclosure.

In certain embodiments, a plurality of light switch apparatus and/or other devices may be grouped into one or more device groups, and user data are communicated to multiple devices as a group. FIG. 12 is a schematic diagram of the server 1100 organizing and communicating with groups of devices 1700. As shown in FIG. 12, communication may be carried on between the server and multiple devices as a group and individually. The server may be used to organize light switch or light switch wall plate users into groups by location, situation or other attributes to differentiate signals received by individual users from the system. In certain embodiments, the system 1100 may also be used to aggregate data of light switch or light switch wall plate user interactions with the devices. The data then may be presented to the administrator, a third party, or the user through the server interface. The server may be further configured to aggregate the apparatus status information corresponding to each light switch apparatus into a data set and present the data set through the server interface.

In certain embodiments, the server 1100 may be implemented as an individual physical computing server connected to the internet. In other embodiments, the server 1100 may be implemented as a distributed cloud server. The server interface may include a software interface installed on the physical computing server, or it may include software interface installed on user devices remote from the server. Alternatively, the server interface may be implemented as web interface, a mobile device interface, or a smart device interface.

In another aspect of the present disclosure, a light switch control method is provided. The light switch control method may be applied to one or more light switch apparatuses. Detailed description of the light switch apparatuses may be found in the embodiments shown in FIGS. 1-9 and the accompanying description, and will not be fully described again.

Figure 13:
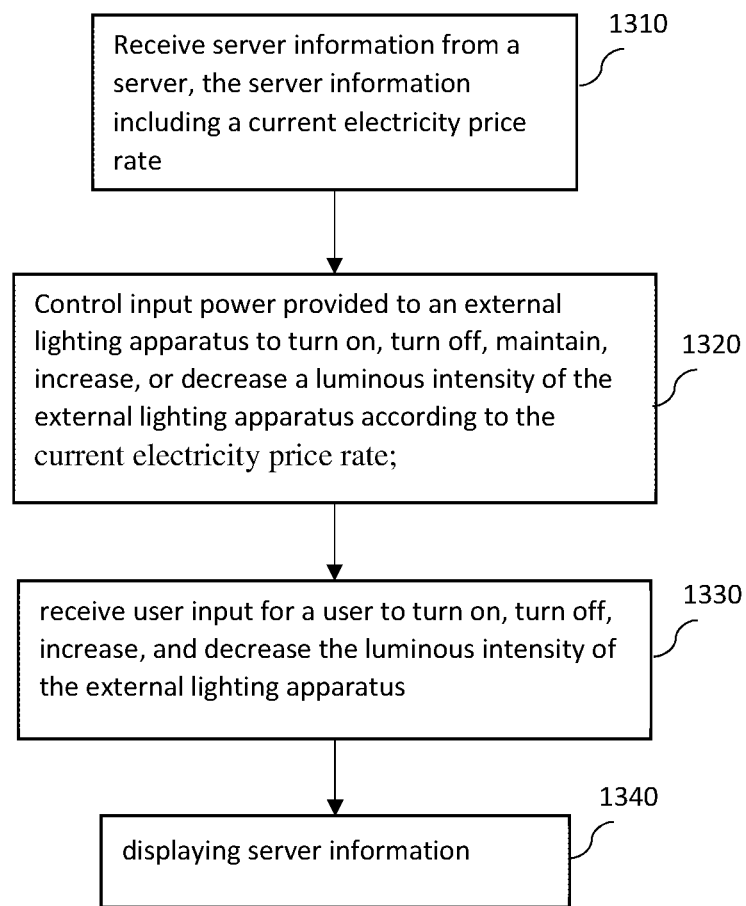
FIG. 13 is a flow chart illustrating the light switch control method according to an embodiment of the present disclosure.

FIG. 13 is a flow chart illustrating the light switch control method according to certain embodiments of the present disclosure. As shown in FIG. 13, the light switch control method may include the following steps.

In Step 1310, a light switch apparatus may receive server information from a server, the server information including a current electricity price rate. In certain embodiments, the light switch apparatus may further receive a pre-programmed schedule from the server. Further, the light switch apparatus may receive additional information, such as alerts and/or notice information from the server.

In Step 1320, the light switch apparatus may control input power provided to an external lighting apparatus to turn on, turn off, maintain, increase, or decrease a luminous intensity of the external lighting apparatus according to the current electricity price rate.

In Step 1330, the light switch apparatus may receive a user input for a user to turn on, turn off, increase, and decrease the luminous intensity of the external lighting apparatus. The user input may be received through a user input unit, such as switches, buttons, dial nobs, sliders, a touch screen, and so on. It may be configured to allow the user to manually turn on, turn off, or adjust the light intensity of the external lighting apparatus. Alternatively, the user input unit may be implemented through a user device, such as a mobile phone, a personal computer, a tablet, and so on, which is connected to the light switch apparatus through a network connection. A user interface may be presented on the user device for the user to access the light switch apparatus.

In Step 1340, the light switch apparatus may display server information. In certain embodiments, displaying server information may include displaying one of a set of colors according to the current electricity price rate, each color corresponding to a range of electricity price rate.

The foregoing description and accompanying drawings illustrate the principles, preferred or example embodiments, and modes of assembly and operation, of the invention; however, the invention is not, and shall not be construed as being exclusive or limited to the specific or particular embodiments set forth hereinabove.

What is claimed is:

1. A light switch system, comprising: a physical light switch member moveable between an on position and an off position and having an outer surface; a computer-readable memory having stored thereon executable instructions; a processor in communication with the computer-readable memory and configured to execute the instructions to cause the system to at least: receive electricity price rate server information from a server, the electricity price rate server information comprising at least a first server data indicative of a high range of a current electricity price rate and a second server data indicative of a low range of the current electricity price rate that is lower than the high range of the current electricity price rate; output a first high range electricity price rate output data when the current electricity price rate is in the high range and to output a second low range electricity price rate output data when the current electricity price rate is in the low range; and an output unit comprising a display that illuminates the outer surface of the physical light switch member, with at least a first output color and a second output color that is different from the first output color, the color emitted determined by a control signal; and a controller that sends the control signal to the display directly in response to receiving the first high range electricity price rate output data and the second low range electricity price rate output data.

2. The light switch apparatus according to claim 1, wherein the network communication unit is configured to compare the first server data indicative of the high range and the second server data indicative of the low range to a predetermined electricity rate price and to determine that the first server data corresponds to a higher range electricity price rate when the first server data is indicative of an electricity rate price that is higher than the predetermined electricity rate price and to determine that second server data corresponds to a lower range electricity price rate when the second server data is indicative of an electricity rate price that is lower than the predetermined electricity rate price.

3. The light switch apparatus according to claim 1, wherein the output unit is further configured to determine a highest electricity price range and a lowest electricity price range and corresponding output colors based upon electricity price information received from the server.

4. The light switch apparatus according to claim 1, wherein the output unit is further configured to receive output information from the server based on a determination of highest and lowest electricity price information as determined by the server.

5. The light switch apparatus according to claim 1, wherein the output unit is further configured to display at least one of a text or an icon according to the electricity price rate server information.

6. The light switch apparatus according to claim 1, wherein the output unit is further configured to sound an alarm in response to the current electricity price rate being within the highest electricity price range or the lowest electricity price range.

7. The light switch apparatus according to claim 1, wherein:
the output unit is further configured to detect a change in the current electricity price rate from being in the highest electricity price range to being in the lowest electricity price range, and sound an alarm in response to the current electricity price rate changing from the highest electricity price range to the lowest electricity price range.

8. The light switch apparatus according to claim 1, wherein:
the light switch apparatus further comprises a wall plate; and
the output unit is located on the wall plate to output information according to the current electricity price rate.

9. The light switch apparatus according to claim 1, further comprising a power control circuit, wherein the power control circuit is configured to turn on, turn off, maintain, increase, and decrease the luminous intensity of the external lighting apparatus according to the current electricity price rate.

10. A light switch system, comprising: a computer-readable memory having stored thereon executable instructions; a processor in communication with the computer-readable memory and configured to execute the instructions to cause the system to at least: receive server information from a server, the server information comprising at least a first server data indicative of an energy price determined by the server, output information according to the server information: a physical light switch member moveable between an on position and an off position and having an outer surface; and an output unit comprising a display that emits at least first and second output colors at the outer surface of the physical light switch member in response to receiving, a control signal; a controller configured to send first and second control signals to the display in response to receiving the server information; the controller configured to send to the display the first control signal corresponding to the first output color in response to receiving the first set of data from the network communication unit indicating a first electricity price and to send the second control signal to the display corresponding to the second output color in response to receiving a second set of data from the network communication unit indicating a second electricity price different from the first electricity price.

11. The light switch apparatus according to claim 10, wherein the server information includes a high value corresponding to the first output color and a low value corresponding to the second output color.

12. The light switch apparatus according to claim 10, wherein the server information includes a preset value corresponding to an output sound.

13. The light switch apparatus according to claim 10, wherein the server information includes data indicative of specific events; the network communication unit is configured to generate output color data according to the data indicative of the specific events; and the output unit is configured to display colors according to the output color data.

14. The light switch apparatus according to claim 10, wherein the server information includes data indicative of specific events; the network communication unit is configured to generate output audio data according to the data indicative of the specific events; and the output unit is configured to output sounds according to the output audio data.

15. The light switch apparatus according to claim 10, further comprising a power control circuit, wherein the power control circuit is configured to turn on, turn off, maintain, increase, and decrease the luminous intensity of the external lighting apparatus according to the server information.

16. A light switch control system, comprising: a server having a processor, a memory, and a server interface; the memory having stored thereon executable instructions; the processor in communication with the memory and configured to execute the instructions to cause the system to at least send server information, the server information including at least a current electricity price rate; a plurality of light switch apparatuses, each light switch apparatus comprising: a physical light switch member moveable between an on position and an off position and having an outer surface; a network communication unit, the network communication unit in communication with the server configured to receive server information from the server, the server information including a current electricity price rate; a user input unit for a user to turn on, turn off, increase, and decrease a luminous intensity of an external lighting apparatus; and a display that emits at the outer surface of the physical light switch member, an output color light selected from a color set, wherein the color set includes a plurality of colors, each color directly corresponding to an electricity price rate range; the plurality of colors include at least a first color corresponding to a highest price rate range and a second color corresponding to a lowest price rate range; and the output color light is selected from the color set according to the current electricity price rate.

17. The system according to claim 16, wherein for each light switch apparatus:
the configuration information corresponding to the light switch apparatus includes a preconfigured rule corresponding to the light switch apparatus, the preconfigured rule including a corresponding relationship between electricity price rate ranges and an output color;
the server interface is further configured to receive a selection of the preconfigured rule corresponding to the light switch apparatus; and the power control circuit of the light switch apparatus is further configured to turn on, turn off, maintain, increase, and decrease the luminous intensity of the external lighting apparatus according to both the current electricity price rate and the preconfigured rule.

18. The system according to claim 16, wherein:

the server interface is further configured to receive an input of alarm information;

the server information further includes an alarm notification according to the alarm information; and the output unit of each light switch apparatus is configured to display the alarm notification.

19. The system according to claim 16, wherein:

the server is further configured to group the plurality of light switch apparatus into one or more light switch apparatus groups; and the server interface is configured to assign configuration information corresponding to each light switch apparatus group.

20. The system according to claim 16, wherein the server interface comprises one of: a web interface, a mobile device interface, and a smart device interface.

* * * * *